US010883458B2

(12) United States Patent
Fochtman et al.

(10) Patent No.: US 10,883,458 B2
(45) Date of Patent: Jan. 5, 2021

(54) ASYMMETRIC SPRING VALVE DISK

(71) Applicant: Continental Automotive Systems, Inc., Auburn Hills, MI (US)

(72) Inventors: James Fochtman, Williamsburg, VA (US); John Walters, Williamsburg, VA (US); Tyler Craven, Norfolk, VA (US)

(73) Assignee: Vitesco Technologies USA, LLC., Auburn Hills, MI (US)

( * ) Notice: Subject to any disclaimer, the term of this patent is extended or adjusted under 35 U.S.C. 154(b) by 68 days.

(21) Appl. No.: 16/023,663

(22) Filed: Jun. 29, 2018

(65) Prior Publication Data

US 2019/0003603 A1 Jan. 3, 2019

Related U.S. Application Data

(60) Provisional application No. 62/528,345, filed on Jul. 3, 2017, provisional application No. 62/528,348, filed (Continued)

(51) Int. Cl.
*F16K 31/06* (2006.01)
*F16K 1/42* (2006.01)
(Continued)

(52) U.S. Cl.
CPC ............ *F02M 37/08* (2013.01); *F02M 37/10* (2013.01); *F02M 51/04* (2013.01);
(Continued)

(58) Field of Classification Search
CPC ...... F16K 15/144; F16K 15/02; F16K 15/021; F16K 15/023; F16K 15/028; F16K 15/14;
(Continued)

(56) References Cited

U.S. PATENT DOCUMENTS 4,240,434 A * 12/1980 Newkirk ............... A61F 2/2412
137/242
5,727,594 A * 3/1998 Choksi ................. A61M 39/24
137/537
(Continued)

FOREIGN PATENT DOCUMENTS

CN  102506201 A  6/2012
CN  103857899 A  6/2014
(Continued)

OTHER PUBLICATIONS

Indian Office Acton dated Jun. 2, 2020 for the counterpart Indian Patent Application No. 201814024804.
(Continued)

*Primary Examiner* — Jessica Cahill

(57) ABSTRACT

A valve assembly for a fluid pump includes a valve body; a fluid inlet and a fluid outlet defined in the valve body; a valve seat; and an inlet disk disposed in the valve body having an inner portion, an outer portion fixed within the valve body, and a plurality of legs connected between the inner portion and the outer portion so that the inner portion is movable between a first position against the valve seat and a second position spaced apart from the valve seat. The connection between the legs, the inner portion and the outer portion provides a spring bias force to the inner portion against movement of the inner portion from the first position. The plurality of legs, the inner portion and the outer portion are configured such that the spring bias force is asymmetric as applied to the inner portion of the inlet disk.

23 Claims, 11 Drawing Sheets

Related U.S. Application Data on Jul. 3, 2017, provisional application No. 62/528,351, filed on Jul. 3, 2017, provisional application No. 62/528,356, filed on Jul. 3, 2017, provisional application No. 62/528,412, filed on Jul. 3, 2017, provisional application No. 62/528,417, filed on Jul. 3, 2017.

(51) Int. Cl.

| | | |
|---|---|---|
| *F16K 15/02* | (2006.01) | |
| *F16K 27/02* | (2006.01) | |
| *F16K 15/14* | (2006.01) | |
| *F02M 37/08* | (2006.01) | |
| *F04B 53/10* | (2006.01) | |
| *F02M 37/10* | (2006.01) | |
| *H01F 7/08* | (2006.01) | |
| *H01F 7/16* | (2006.01) | |
| *F02M 59/46* | (2006.01) | |
| *F02M 51/04* | (2006.01) | |
| *F02M 63/00* | (2006.01) | |
| *F02M 59/10* | (2006.01) | |
| *F04B 23/02* | (2006.01) | |
| *F02M 55/00* | (2006.01) | |
| *F04B 39/10* | (2006.01) | |
| *F04B 17/04* | (2006.01) | |
| *F02M 51/06* | (2006.01) | |
| *F02M 59/36* | (2006.01) | |
| *B21D 39/06* | (2006.01) | |
| *F02M 37/54* | (2019.01) | |
| *F02M 37/04* | (2006.01) | |

(52) U.S. Cl.
CPC ...... *F02M 51/0614* (2013.01); *F02M 55/007* (2013.01); *F02M 59/10* (2013.01); *F02M 59/367* (2013.01); *F02M 59/462* (2013.01); *F02M 59/464* (2013.01); *F02M 59/466* (2013.01); *F02M 63/0019* (2013.01); *F02M 63/0078* (2013.01); *F04B 17/04* (2013.01); *F04B 23/021* (2013.01); *F04B 39/1046* (2013.01); *F04B 53/10* (2013.01); *F04B 53/103* (2013.01); *F04B 53/109* (2013.01); *F04B 53/1032* (2013.01); *F04B 53/1035* (2013.01); *F04B 53/1087* (2013.01); *F16K 1/42* (2013.01); *F16K 15/02* (2013.01); *F16K 15/028* (2013.01); *F16K 15/14* (2013.01); *F16K 27/0209* (2013.01); *F16K 31/0689* (2013.01); *H01F 7/081* (2013.01); *H01F 7/1607* (2013.01); *B21D 39/06* (2013.01); *F02M 37/043* (2013.01); *F02M 37/54* (2019.01); *F02M 2200/8053* (2013.01)

(58) Field of Classification Search
CPC .... F16K 27/0209; F16K 31/0689; F16K 1/42; F02M 63/0019; F02M 37/08; F02M 37/10; F02M 51/04; F02M 51/0614; F02M 55/007; F02M 59/10; F02M 59/367; F02M 59/462; F02M 59/464; F02M 59/466; F02M 63/0078; Y10T 137/7895; Y10T 137/7888; Y10T 137/7892; Y10T 137/7879

See application file for complete search history.

(56) References Cited

U.S. PATENT DOCUMENTS

| | | | | |
|---|---|---|---|---|
| 6,240,962 | B1* | 6/2001 | Tai | F15C 5/00 137/852 |
| 6,390,130 | B1* | 5/2002 | Guala | A61M 39/24 137/859 |
| 6,401,749 | B1* | 6/2002 | Tai | F16K 15/021 137/514 |
| 8,528,591 | B2* | 9/2013 | Pirk | F04B 43/043 137/493.8 |
| 10,082,008 | B2 | 9/2018 | Robey et al. | |
| 10,082,088 | B2* | 9/2018 | Marocchini | F02C 9/32 |
| 2002/0176786 | A1* | 11/2002 | Hirose | F04B 39/108 417/269 |
| 2004/0182446 | A1* | 9/2004 | Semeia | F16K 15/148 137/512.5 |
| 2010/0266432 | A1 | 10/2010 | Pirk et al. | |
| 2012/0085323 | A1 | 4/2012 | Allen et al. | |
| 2013/0061939 | A1 | 3/2013 | Leppert et al. | |
| 2013/0062440 | A1 | 3/2013 | Czimmek | |
| 2015/0077562 | A1 | 3/2015 | Heckel et al. | |
| 2016/0237973 | A1* | 8/2016 | Bleeck | F02M 63/0022 |
| 2017/0268469 | A1 | 9/2017 | Plisch et al. | |
| 2017/0321643 | A1 | 11/2017 | Krause et al. | |
| 2018/0251122 | A1 | 9/2018 | Golston et al. | |

FOREIGN PATENT DOCUMENTS

| | | |
|---|---|---|
| CN | 105008709 A | 10/2015 |
| DE | 1809954 A1 | 5/1970 |
| DE | 1911534 A1 | 9/1970 |
| DE | 102011005487 A1 | 9/2012 |
| JP | S595783 A | 1/1984 |
| WO | 2012123131 A1 | 9/2012 |

OTHER PUBLICATIONS

Chinese First Office Action dated Jun. 3, 2020 for the counterpart Chinese Patent Application No. 201810717896.3.

File history for U.S. Appl. No. 16/025,268, including final Office Action dated May 21, 2020.

File history for U.S. Appl. No. 16/023,988, including non-final Office Action dated Mar. 6, 2020.

File history for U.S. Appl. No. 16/026,916 filed Jul. 3, 2018

* cited by examiner

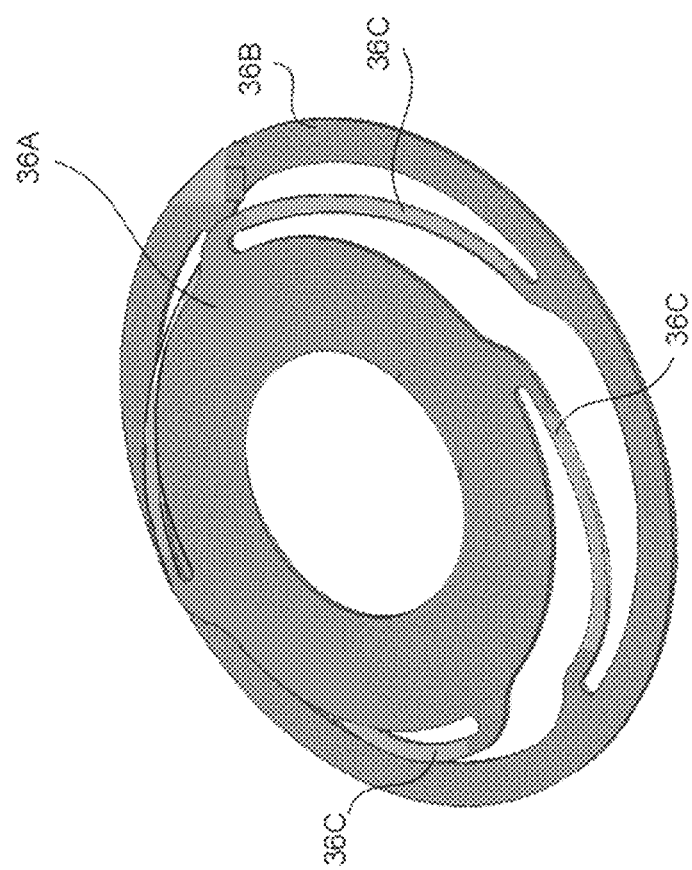
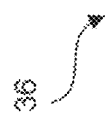
FIG. 7

ASYMMETRIC SPRING VALVE DISK

CROSS REFERENCE TO RELATED APPLICATIONS

The present application claims the benefit of the following provisional applications filed on Jul. 3, 2017: application No. 62/528,348, titled "Combined Inlet and Outlet Check Valve Seat"; application No. 62/528,345, titled "Asymmetric Spring Valve Disk"; application No. 62/528,356, titled "Hydraulic Damping of a Solenoid"; application No. 62/528,412, titled "Fuel Pump Valve Configuration and Assembly"; application No. 62/528,351, titled "Fuel Pump Solenoid Assembly Method"; and application No. 62/528,417, titled "Fuel Sending Unit Assembly and Operation." The content of these provisional patent applications are incorporated by reference herein in their entirety.

FIELD OF INVENTION

This invention relates to a valve assembly for a fluid pump, and particularly to a valve assembly having an asymmetric spring valve disk.

BACKGROUND

Existing fuel pump check valves use an asymmetric spring that is connected to a separate valve sealing element. These are two different parts. The spring has an outer ring with two legs extending to the middle where there is a smaller ring. The valve sealing element protrudes through the middle of the small ring and a rubber stopper/bushing is pressed on the valve sealing component to ensure that the spring is flush to the valve sealing element. On one face of the valve sealing element there is an O-ring that is used to seal the pressurized chamber from the venting chamber. Together, along with a housing that encases the two, the valve sealing element and the spring act as a typical pressure check valve. When the spring is in an expanded position, the spring pushes the valve sealing element to seal and let no liquid flow by; and when the spring is in a compressed position, the valve sealing element moves to an area of the body that allows flow to exit the pressurized chamber. The spring that is used in conjunction with the valve sealing element is made asymmetric. With this characteristic, the spring exerts uneven forces around the perimeter of the valve sealing element. In this case, when valve receives pressure, the location on the valve sealing element which has the least amount of force will lift quickly, causing the valve to open similar to a hinged door. This characteristic makes for quicker and more stable valve response, since variation of the valve opening caused by fluttering is now under control.

Another prior check valve is the typical ball spring/needle spring check valve. Such check valve works very similarly to the valve stated above, except it uses a spring and ball instead of a spring and disc as the dynamic sealing element. The ball is a sphere and opens due to the pressure that is exerted on the sphere. This usually provides for a slower valve response since the drag around a ball is much less than drag around a flat disc. The mass of the ball is usually significantly more than a disc, also causing a slower valve response which can cause inefficient backflow especially when the valve is required to operate at high frequencies (e.g., >80 Hz).

In order for this prior check valve to function properly, a total number of four parts are needed in order to create the "spring valve sealing element" assembly. More materials cause higher build of material cost and cost in manufacturing. The prior check valve also does not address capability of high frequency operation, likely due to the mass of the valve sealing element that is attached to the spring. In addition, areas where chemicals may be used in check valve scenarios, O-rings and rubber seals seen in the prior valves may not be durable in high frequency fluid applications. Installation and assembly size would also be inconvenient in small applications because of the four part spring-seal valve design.

SUMMARY

According to an example embodiment, there is disclosed a valve assembly for a fluid pump, including a valve body; a fluid inlet and a fluid outlet defined in the valve body; a valve seat; and an inlet disk disposed in the valve body having an inner portion, an outer portion fixed within the valve body, and a plurality of legs connected between the inner portion and the outer portion so that the inner portion is movable between a first position against the valve seat and a second position spaced apart from the valve seat and that a spring bias force is applied to the inner portion against movement of the inner portion from the first position. The plurality of legs, the inner portion and the outer portion are configured such that the spring bias force is an asymmetric spring bias force applied to the inner portion of the inlet disk.

The inner portion has no spring bias force applied thereto when the inner portion is in the first position. The plurality of legs is four legs.

In an example embodiment, at least one dimension of a first leg of the plurality of legs is different from the at least one dimension of at least one second leg of the plurality of legs.

In another example embodiment, the valve assembly further includes a stop member having a stop surface against which the inner portion of the inlet disk contacts when the inner portion is in the second position, and the inner portion does not contact the stop surface when the inner portion of the inlet disk is in the second position.

In one aspect, connection locations of the legs to the inner portion are even distributed about the inner portion. In another aspect, connection locations of the legs to the inner portion are not even distributed about the inner portion.

The inner portion may be one of an annular shape and a semi-annular shape.

The inlet disk may include at least one of: the inner portion and the outer portion are not concentric with each other; an outer radial edge of the inner portion is not concentric with an inner radial edge of the inner portion; and an outer radial edge of the outer portion is not concentric with an inner radial edge of the outer portion.

The inner portion and the outer portion may be configured such that a first section of the inner portion of the inlet disk is moved from the valve seat prior to other sections of the inner portion moving from the valve seat, the inlet disk and the valve seat form at least part of an inlet valve of the valve assembly, the valve body comprises an inlet fluid passage in fluid communication with the inlet valve, and the inlet fluid passage is disposed directly beneath the valve seat and the first section of the inner portion of the inlet disk.

The inner portion may be ring shaped, having a through-hole in a radial center portion of the inlet disk, and the outer portion may be ring shaped.

Another example embodiment is directed to a check valve including a valve body; a fluid inlet and a fluid outlet defined in the valve body; a valve seat; and a disk disposed in the valve body having an inner portion, an outer portion fixed within the valve body, and a plurality of legs connected between the inner portion and the outer portion so that the inner portion is movable between a first position against the valve seat and a second position spaced apart from the valve seat. A spring bias force is applied to the inner portion against movement of the inner portion from the first position. The legs, the inner portion and the outer portion are configured and arranged such that the spring bias force is an asymmetric spring bias force applied to the inner portion of the inlet disk.

BRIEF DESCRIPTION OF THE DRAWINGS

FIG. 7 is a perspective view of the inlet disk of FIG. 6 in the extracted position;

DETAILED DESCRIPTION

Example embodiments are generally directed to a valve group or valve assembly for a fuel pump which pumps fuel into a fuel line of an apparatus, such as a two or four wheeled vehicle, having a gasoline combustion engine. The fuel pump is configured to be submerged within the fuel tank of the vehicle or other apparatus of which the fuel pump is a part. The pump is controlled by an ECU of the apparatus. The valve group includes an inlet check valve and an outlet check valve which include a combined valve seat. The valve group is operatively connected to a solenoid power group or assembly to form the fuel pump.

The example embodiments are directed to the valve group of a fuel pump. The pump provides a filtered, metered by volume of fuel "sent" from the tank to the fuel line (not shown) at the proper pressure. This "sent" fuel keeps a fuel line at the proper pressure for the fuel injector (not shown) ported to the other end of the fuel line. This allows for the removal of the return line, inline filter and a pressure regulator. The pump is commanded by an electronic control unit (ECU) and generally runs synchronously with the timing of the fuel injector which is also controlled by the ECU (not shown), actuation to provide the fuel at the proper time.

It is understood that references to "upstream" and "downstream" herein are relative to the direction of fuel flow through the valve group pump.

Figure 1:
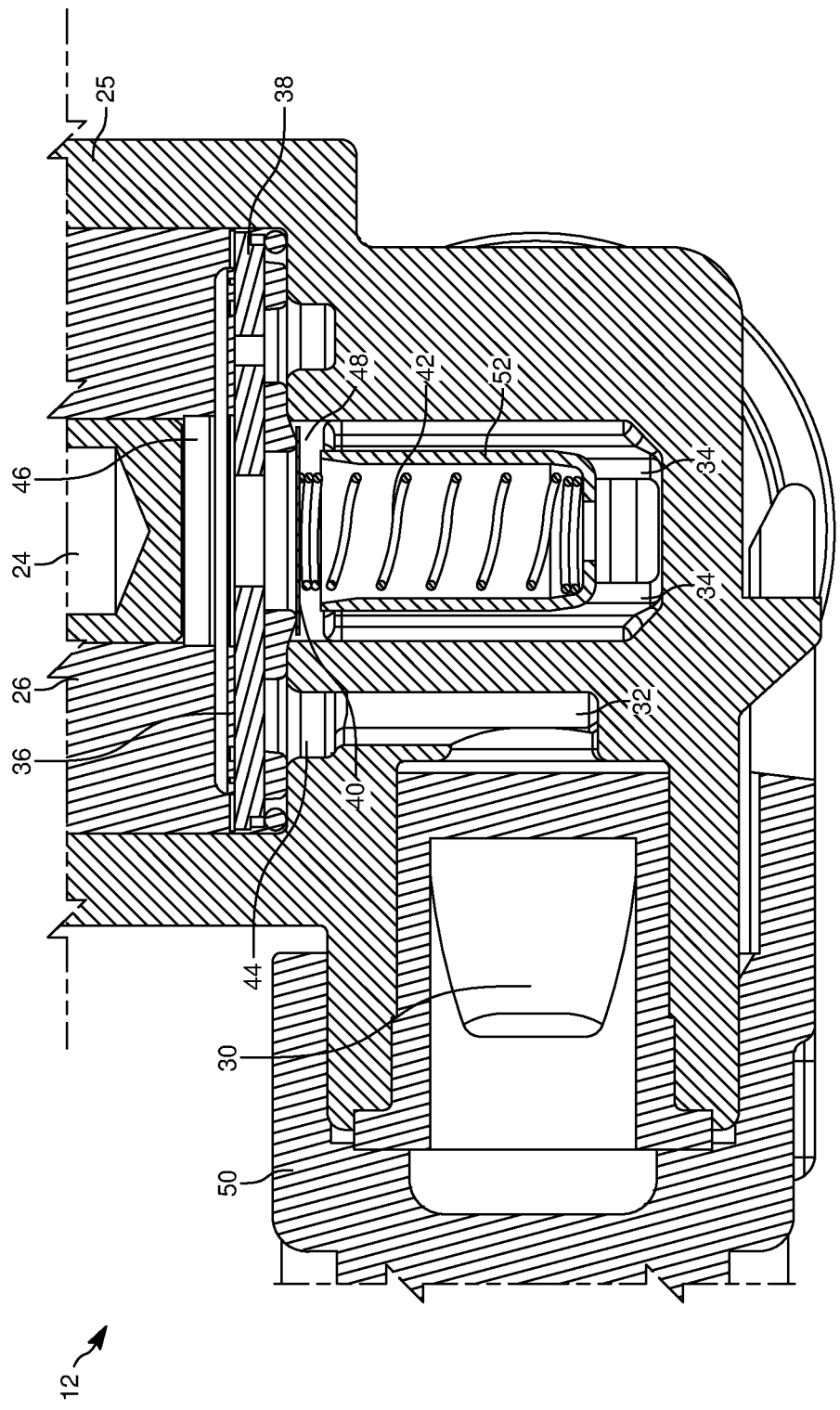
FIG. 1 is a cross sectional view of a portion of the valve group of the fuel pump according to an example embodiment.
Figure 2:
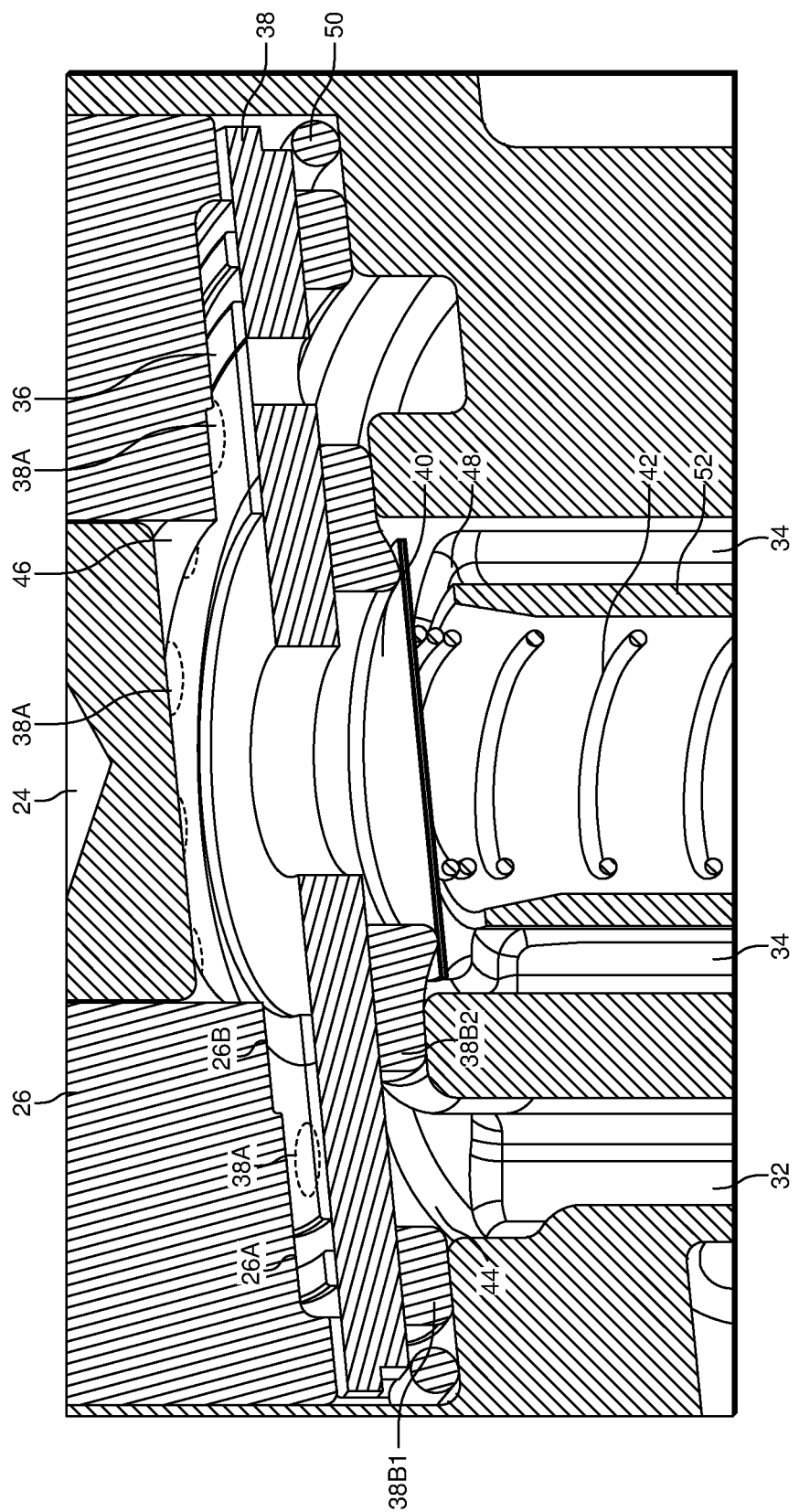
FIG. 2 is an expanded perspective view of the valve group portion of the fuel pump of FIG. 1.
Figure 3:
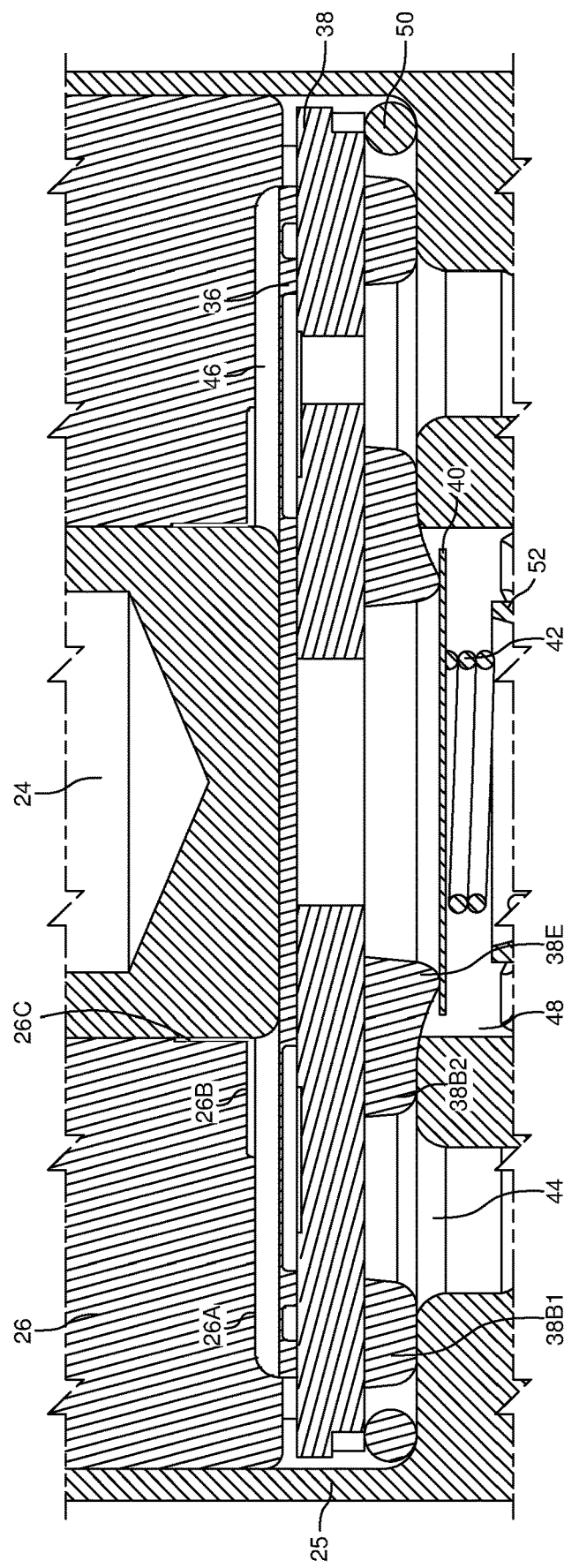
FIG. 3 is a cross sectional view of the valve group portion of the fuel pump of FIG. 1.

As shown in FIGS. 1-3, a valve group or assembly 12 includes a pump body 25, a bushing 26 at least partly disposed in pump body 25 and having a through-hole in which a plunger 24 is movably displaced, and a protection valve 30 disposed within the pump body 25. Plunger 24 is connected to an armature of the solenoid power group (not shown) so that the protection valve 30 is under control of the power group to which the valve group 12 is connected.

Pump body 25 includes a fuel inlet passage 32 (FIG. 1) defined therein in which fluid which passes through the protection valve 30 flows. The pump body 25 further includes one or more fluid outlet passages 34 through which fuel passes prior to exiting the pump body 25. Disposed between the fuel inlet passage 32 and the fuel outlet passage 34 is an inlet disk 36, a valve seat 38 and an outlet disk 40. The valve seat 38 is fixedly disposed within the pump body 25. Best seen in FIGS. 2 and 3, a portion of the inlet disk 36 is movably disposed between the bushing 26 and the valve seat 38, and the outlet disk 40 is disposed downstream of the valve seat 38. An outlet spring 42 is disposed within the pump body 25 to bias the outlet disc 40 against the valve seat 38. The inlet disk 36 and the valve 38 seat serve as an inlet check valve of the valve group 12, and the outlet disk 40, outlet spring 42 and the valve seat 38 serve as the outlet check valve of the valve group 12. A longitudinal axis of the fluid inlet passage 32 is perpendicular to a lateral or radial axis of the valve seat 38, and a longitudinal axis of each fluid outlet passage 34 is perpendicular to a direction of fuel flow exiting the valve seat 38.

Within the pump body 25 are a number of chambers for holding fuel. Referring to FIGS. 1-3, an inlet chamber 44 is formed at least partly within fuel inlet passage 32 upstream of inlet disk 36. A pump chamber 46 is defined at least partly within the through-hole of bushing 26 in which plunger 24 is disposed, and includes the space downstream of inlet disk 36 and upstream of outlet disk 40. An outlet chamber 48 is disposed downstream of outlet disk 40 and is at least partly defined within the fuel outlet passages 34. As indicated in FIGS. 1 and 2, the inlet chamber 44 encircles or surrounds the outlet chamber 44.

The generally cylindrical plunger 24 is co-axially disposed with the longitudinal axis of the bushing 26. To reduce or minimize the volume of the pump chamber 46, the tip of the plunger 46 during certain portions of fuel pump operation is below the "stop" surface of the inlet disk 36 and is very close to the valve seat 38, while at other times, the plunger 46 is above such stop 26A of the bushing and within the tight clearance of the bushing 26 that mates with the plunger 24 to make a "seal" while operating. This seal is made by having a relatively small diametrical clearance gap (e.g., 5-15 microns) which is difficult for fuel to leak through during a compression stroke yet helps during priming of the fuel pump by allowing air in the pump chamber 46 to exit without requiring the air to pass into the fuel line.

Figure 4:
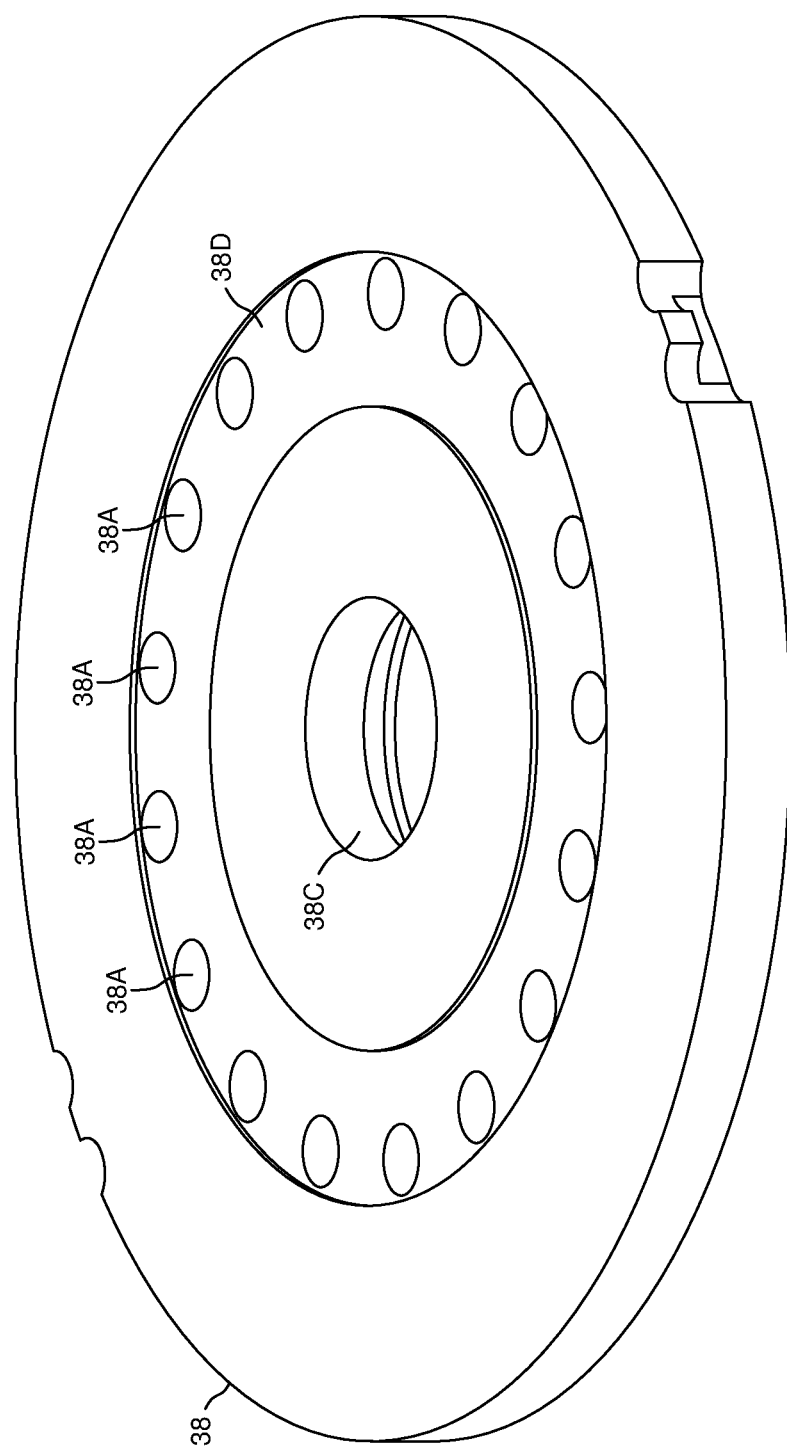
FIG. 4 is a perspective top view of the valve seat of the valve group of FIG. 1.
Figure 5:
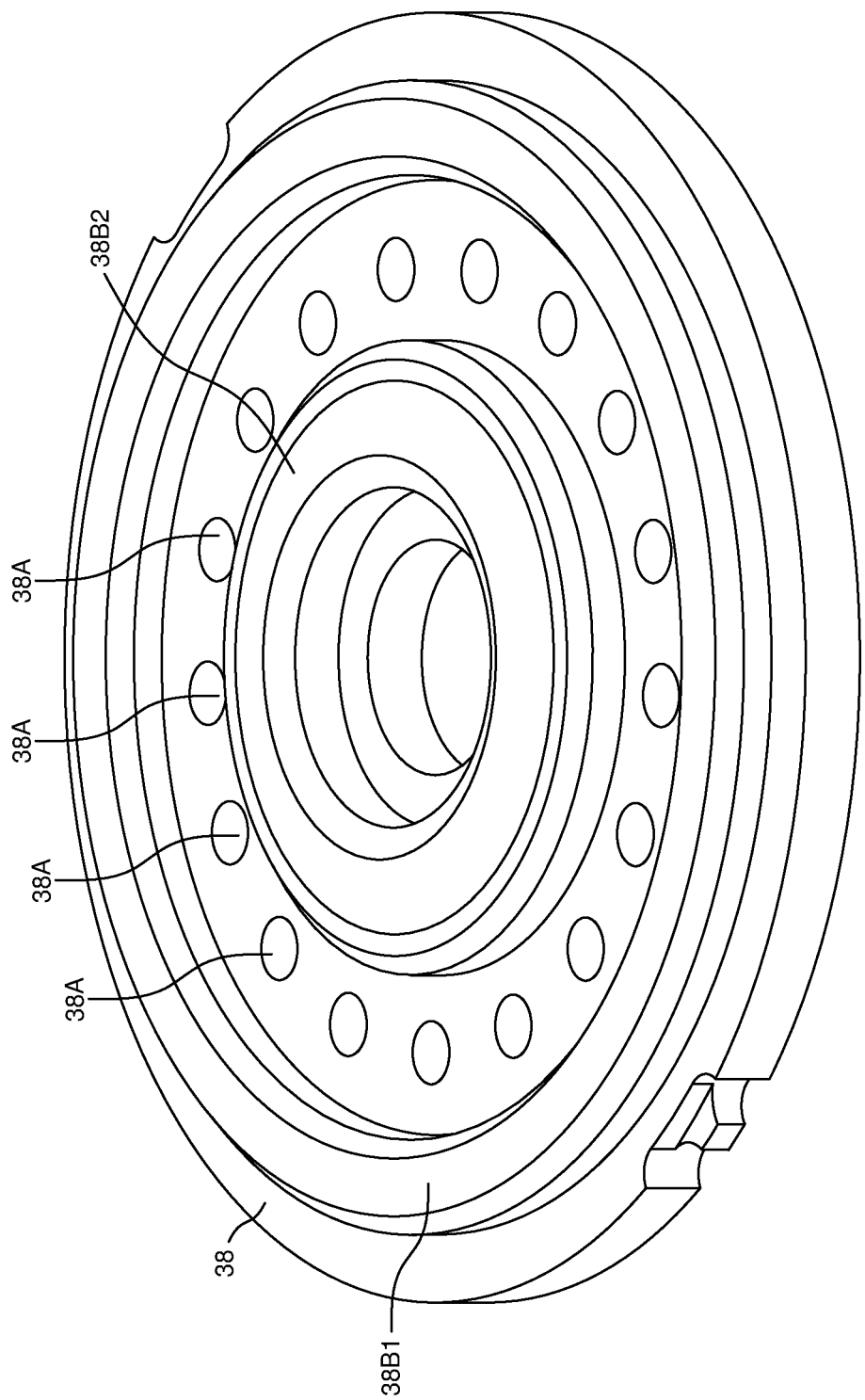
FIG. 5 is a perspective bottom view of the valve seat of the valve group of FIG. 1.

Best seen in FIGS. 4 and 5, the valve seat 38 is a disc or cylindrical shaped member constructed from metal, plastic or similarly rigid material. Valve seat 38 includes a plurality of apertures 38A defined axially or nearly axially through the seat. In the example embodiment illustrated, the apertures 38A surround a radial center of the valve seat 38, and are evenly distributed about the center and arranged in a bolt circle pattern. The number and size of apertures 38A may vary dependent upon the particular application of the valve group 12. At least one aperture 38A is disposed directly above the inlet chamber 44. Fuel passing from the inlet chamber 44 to the pump chamber 46 pass through the apertures 38A and urge a portion of the inlet disk 36 away from the valve seat 38, thereby opening the inlet check valve and forming a fuel path into the pump chamber 46. Apertures 38A surround an aperture 38C defined axially through a radial center of the valve seat 38. Aperture 38C has a larger diameter than the diameter of apertures 38A.

The valve seat 38 includes a relatively shallow groove 38D defined along the upper surface of the seat. A downstream end of each aperture 38A is located within the groove 38D. This groove 38D is at least the width of the apertures 38A, and runs or extends 360 degrees around the valve seat 38, ensuring each of the apertures 38A is within the groove 38D. The groove depth may vary but is generally not more than half of the thickness of the valve seat 38D itself.

Figure 6:
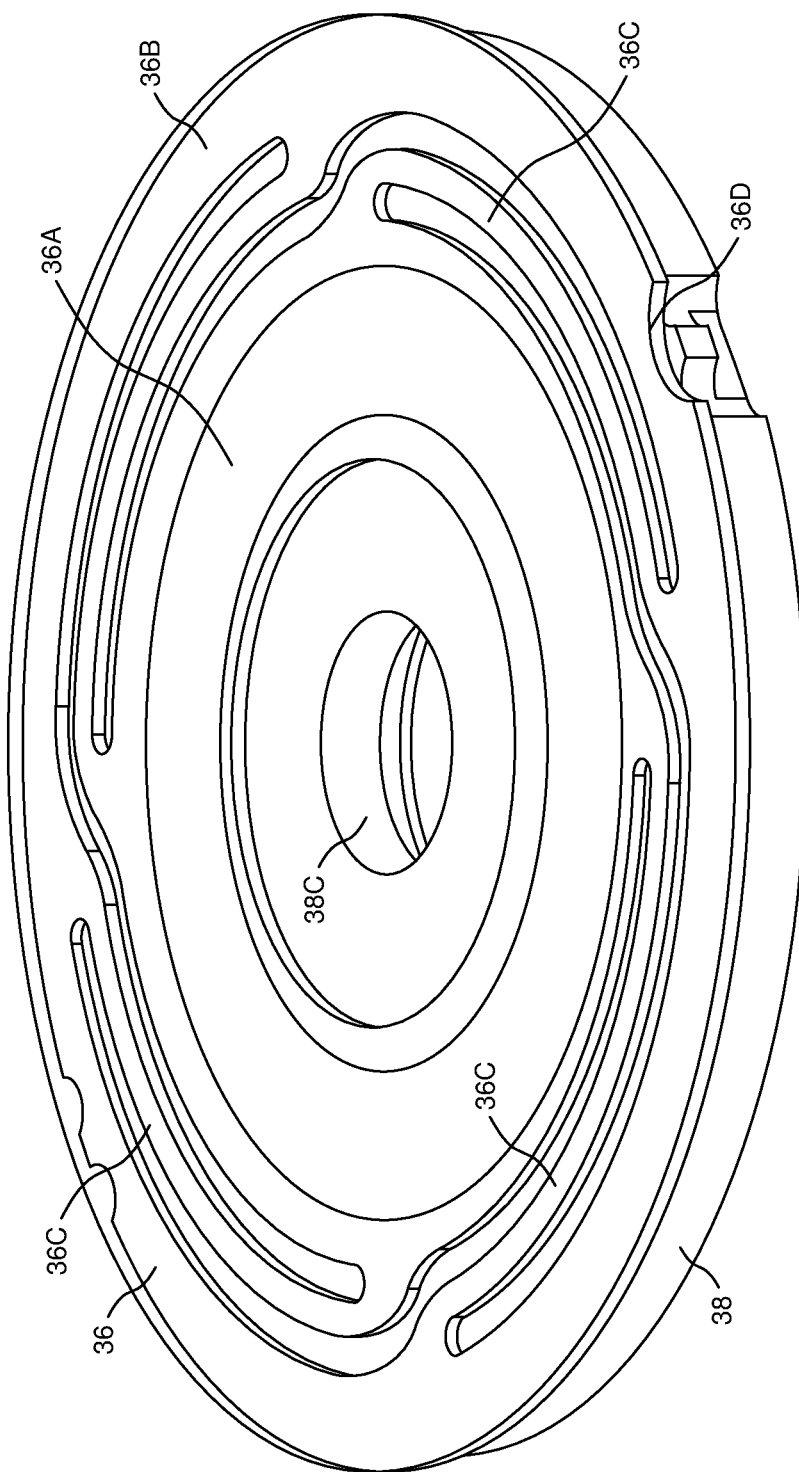
FIG. 6 is a perspective top view of the valve seat and inlet disk of the valve group of FIG. 1.

The top of the valve seat 38 is flat and/or planar and has a polished finish to aid in sealing since the inlet disk 36 contacts the polished area. As best shown in FIG. 6, the inlet disk 36 only covers up the radial outer portion of the top surface of the valve seat 38 and the apertures 38A along with the groove 38D. The radial center portion of the valve seat 38, where the aperture 38C is located, is not covered up by the inlet disk 36. The inlet interface between the valve seat 38 and the inlet disk 36 is metal-to-metal and both parts are flat and smooth in order to provide a seal. This inlet disk 36 seals with the valve seat 38 on either side of the groove 38D so a large amount of the inlet disk 36 does not actually touch the valve seat 38. The groove 38D allows reduced or minimal contact between the inlet disk 36 and the top of the valve seat 38, as well as allows the inlet fluid pressure to communicate to a significant area of the inlet disk 36 during operation of the valve group 12, as discussed in greater detail below. The space within the groove 38D and the space in the apertures 38A form part of the inlet chamber 44.

The bottom surface of the valve seat 38 has two radially separated but concentric, raised seat rings 38B molded onto and extending from the bottom surface, as shown in FIG. 5. The seat ring 38B1 is the radially outermost seat ring 38B which is bonded in between the outer diameter of the valve seat 38 and the bolt circle of apertures 38A. The seat ring 38B2 is bonded in between the center aperture 38C and the apertures 38A. This seat ring 38B has an extra protrusion or lip 38E (FIG. 3) added along the inner diameter of the ring so as to extend in an axial direction further away from the inlet disk 36 than the rest of the seat ring 38B2 and the seat ring 38B1. Along this protrusion 38E is where the flat, circular outlet disk 40 sealing contacts the bottom of the valve seat 38 and provide a seal between the pump chamber 46 and the outlet chamber 48. Best seen in FIGS. 2 and 3, the inlet chamber 44 is at least partly defined between the two seat rings 38B, and the pump chamber 46 is partly defined in the space in the center aperture 38C and the space within the inner seat ring 38B2. The rings 38 are constructed from a resilient, elastic and/or compressible material, such as rubber. Seat ring 38B2 provides a sealing surface for the outlet disk 40, and seat rings 38B1 and 38B2 provide sealing surfaces for a wall within the valve body 25 so as to at least partly define the inlet chamber 44 and the fuel inlet passage 32, as shown in FIGS. 2 and 3. In addition to providing a sealing contact and controlling fuel flow between the pump chamber 46 and the outlet chamber 48, the seat ring 38B2 also provides a seal between the inlet chamber 44 and each of the pump chamber 46 and the outlet chamber 48. The seat ring 38B1 provides a seal between the inlet chamber 44 and the pump chamber 46.

As mentioned, a portion of the inlet disk 36 is displaceable between the bushing 26 and the valve seat 38. As shown in FIGS. 2 and 3, the bushing 26 includes a stop 26A against which part of the inlet disk 36 contacts when the inlet disk 36 is separated from the valve seat 38 which allows fuel to pass from the inlet chamber 44 to the pump chamber 46. The height of the stop 26A is used to control the maximum stress in the inlet disk 36 to be less than the infinite life fatigue limit of the material of the inlet disk 36, while allowing enough opening separation of the inlet disk 36 from the valve seat 38 to not limit the intake flow rate. The bushing 26 also includes a step 26B which in the illustrated embodiment is disposed radially inwardly of the stop 26A so as to reduce the contact surface of the bushing 26 with the inlet disk 36, thereby providing easier separation thereof when the inlet disk 36 returns to its position against the valve seat 38.

Referring to FIG. 6, which depicts the inlet disk 36 and the valve seat 38 in a stacked arrangement, the inlet disk 36 includes a radially inner portion or band 36A and a radial outer portion or band 36B. In the example embodiment illustrated, the outer portion 36B is fixed within the valve body 25. Absent pressure forces, the inner portion 36A of the inlet disk 36 is disposed over the groove 38D of the valve seat 38, such that the inner portion 36A contacts both of the radial inner edge surface and the radial outer edge surface which define the radial extent of the groove 38D. Connected between the inner portion 36A and the outer portion 36B are a plurality of legs or webs 36C. Legs 36C extend between the inner portion 36A and the outer portion 36B and are configured so as to serve as a spring for allowing the inner portion 36A to be lifted or otherwise elevated relative to the outer portion 36B, while urging the inner portion 36A towards the valve seat 38 once the lifting force is lessened. In the example embodiments, during energizing of the solenoid of the power group, to which the valve group 12 is operatively coupled, causes the plunger 24 to move away from the valve seat 38, thus increasing the size of the pump chamber 46 and creating a pressure differential between the inlet chamber 44 and the pump chamber 46. This pressure differential, when exceeding the bias force associated with the legs 36C, causes the inner portion 36A of the inlet disk 36 to separate from the valve seat 38 and move towards the bushing 26, thereby allowing fuel to pass through apertures 38A. Subsequently, when the solenoid is de-energized, the plunger 24 moves towards the valve seat 38 so as to decrease the size of the pump chamber 46 and increase the pressure therein, the inner portion 36A moves away from the bushing 26 and returns to its original position largely in the same plane as the outer portion 36B. In an example embodiment, one or more of the legs 36C is sized differently so as to provide an asymmetric spring in which a first section of the inner portion 36A is lifted away from the valve seat 38 prior to other sections of the inner portion 36A lifting from the valve seat 38, and another section of the inner portion 36A moves from the bushing 26 to the valve seat 38 prior to other sections of the inner portion 36A doing same. In an example embodiment, each leg 36C is configured differently from each of the other legs 36A.

Compared to the prior devices, where a preloaded spring is used in the direction of sealing to improve the leaking condition in the closed state, in the example embodiments, the inlet disk 36 sits flat (unstressed) on the planar valve seat 38 with no installed pre-load holding the disk 36 against the seat 38. This flat/no load condition allows the inlet disk 36 to close when the flow stops, since very small flows can pass. This characteristic minimizes or reduces the intake flow time of fuel through the valve group 12. The asymmetric load begins when the inlet disk 36 is separated from the valve seat 38, when the pressure in the source is higher than the pressure of the liquid. This force allows the inner portion 36A of the disk 36 to tilt. When the intake flow is high enough, this tilted section of the inner portion 36A contacts the stop 26A of the bushing 26. As the flow is reduced (i.e., when the differential pressure is smaller due to the intake flow), the force tends to separate the inner portion 36A from the stop 26A using peel and/or in a peeling manner, and when the flow is reduced further, the inner portion 36A of the inlet disk 36 separates from the stop 26A and contacts the valve seat 38 again.

In the embodiment illustrated in FIGS. 6 and 7, the inner portion 36A and the outer portion 36B have annular shapes. It is understood that one or both of the inner portion and the outer portion may have a different shape.

Inlet disk 36 is a thin, spring steel valve disk with the outer portion 36B that holds the valve geometry that exists in the inner portion 36A of the disk 36. The outer portion 36B is joined to the valve body 25, by clamping or other suitable method. From the outer portion 36B, the plurality of legs 36C are disposed at varying angles along the inner diameter of the outer portion 36A. See FIGS. 6 and 7. The four legs 36C branch off radially along the inner diameter of the outer portion 36B at a given distance. The legs 36C connect to the inner portion 36A, which is a ring shaped part of the inlet valve. The inner portion 36A is suspended in the center of the outer portion 36B by means of four legs 36C. The length, angle and width of the legs 36C may be varied in order to control the amount of deflection that occurs to the inner portion 36A due to pressure exerted thereon. The inlet disk 36 is of the same material throughout with a highly polished surface finish for making a seal to the surface of the valve seat 38. The inner portion 36A takes the place of the valve sealing element and the O-ring that is used in prior devices. Since the spring is built in around the inner portion 36A, no rubber bushing is required in order to join the inner portion 36A and the outer portion 36B, as such portions are naturally already joined by the geometry design itself.

The inlet disk 36 is a stainless steel spring that serves the dual purpose as both the sealing band and the spring. The asymmetric inlet disk 36 is capable of operation with a wide range of fluids. In cases in which the disk 36 may be installed in a small space and operated so that the inner portion 36A may make contact with a surface above the disk, with the length, angle, and width of the legs 36C suspending the inner portion 36A may be configured in such a way to ensure that the legs 36C at the connection with the inner portion 36A do not hit either stop surface. In other words, the inlet disk 36 may be designed to ensure that the connection between the legs and the inner portion 36A have lower deflection than the rest of the inner portion 36A. With this characteristic, the legs 36C that connect to the inner portion 36A will not wear against a surface causing premature spring fatigue. This fatigue could eventually lead to premature variation or complete failure in which a leg 36C detaches completely from the inner portion 36A. The inner portion 36A has been maximized or otherwise increased in order to reduce wear over time. Added to these benefits, the absence of preloading on the inlet disk 36 minimizes or otherwise reduces the closing velocity which reduces wear which, in turn, reduces the dynamic changes in performance over the life of the inlet valve of the valve group 12.

As mentioned, the asymmetric spring inlet disk 36 lays flat on the valve seat 38 and serves as both being a seal and spring in one part. This application works well for certain pumps, such as certain fuel pumps, where a check valve must be installed in a very small area or where the pump chamfer is so small that a typical ball check valve, or check valve stated in prior devices would not fit conveniently. Also the use of the inlet disk 36 in the valve group 12 allows for the dead volume of the pump chamber 48 to be minimal or otherwise markedly reduced, since the stainless steel spring of the inlet disk 36 allows for a very large flow area at small spring displacements.

The angle, length, and width of the legs 36C have been configured with respect to the outer portion 36B and the inner portion 36A wherein the inner portion 36A will lift/peel from the surface of the valve seat 38 that it is sealing from the same location every time. In other words, one section of the inner portion 36A has the least amount of spring bias force applied thereto due to the spring leg configuration. This section of the inner portion 36A will open first, before other sections of the inner portion 36A, when under pressure, thereby preventing the inlet disk 36 from fluttering while open. This fluttering has been known to cause variation of the fluid flow through the sealing surface created by disk 36 and the seal in question. This characteristics allows the disc 36 to peel from one section to another, away from the surface in question. Once the disk 36 is allowed to peel, the rest of the disk 36 follows through to the designated full stroke based upon the pressure that is applied to the inner portion 36A of the disk 36.

The inlet disk 36 is able to use its flat surface area of the inner portion 36A to keep the inlet valve open while liquid (fuel) flows through the inlet and transfers its momentum to the disk 36. In contrast, a ball/needle valve allows fluid to travel more fluently around it, and has much less force transmitted to hold the ball/needle valve open. The inlet disk 36 of the inlet check valve of the example embodiments peels from the valve seat 38 while opening (i.e., separating from the valve seat) and seats on the maximum opening displacement stop 26A in an anti-peel fashion, and then while closing, peels away from the maximum displacement stop 26A and then re-seats against the valve seat 38 in an anti-peel fashion. This characteristic makes the change of state conditions extremely fast and repeatable. The inlet check valve of the example embodiments has an advantage of having a significantly small moved mass compared to ball and needle style check valve and the other prior check valves, which allows this present inlet valve to change states faster because of the reduced inertia. Another advantage of this inlet check valve when compared to the prior check valves is the flow area created for a given deflection. The inlet check valve of the example embodiments creates a substantially larger flow area (2-5 times) when compared to prior check valves. These characteristics combine to make a passive inlet check valve with close to digital performance. The packaged size of the inlet disk 36 allows for very compact installation.

Figure 8:
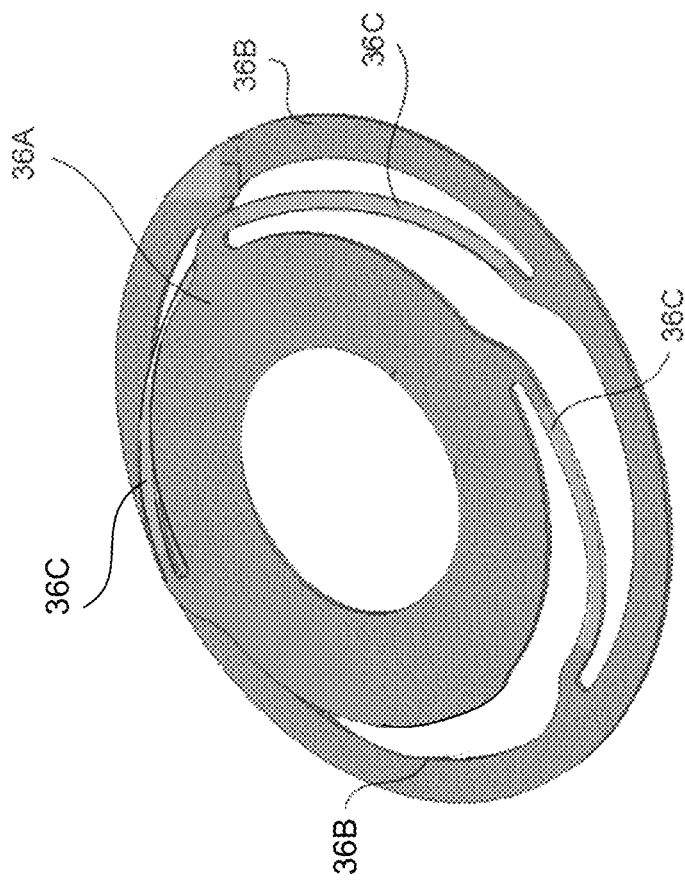
FIG. 8 is a perspective view of an inlet disk in the extracted position according to another example embodiment.
Figure 9:
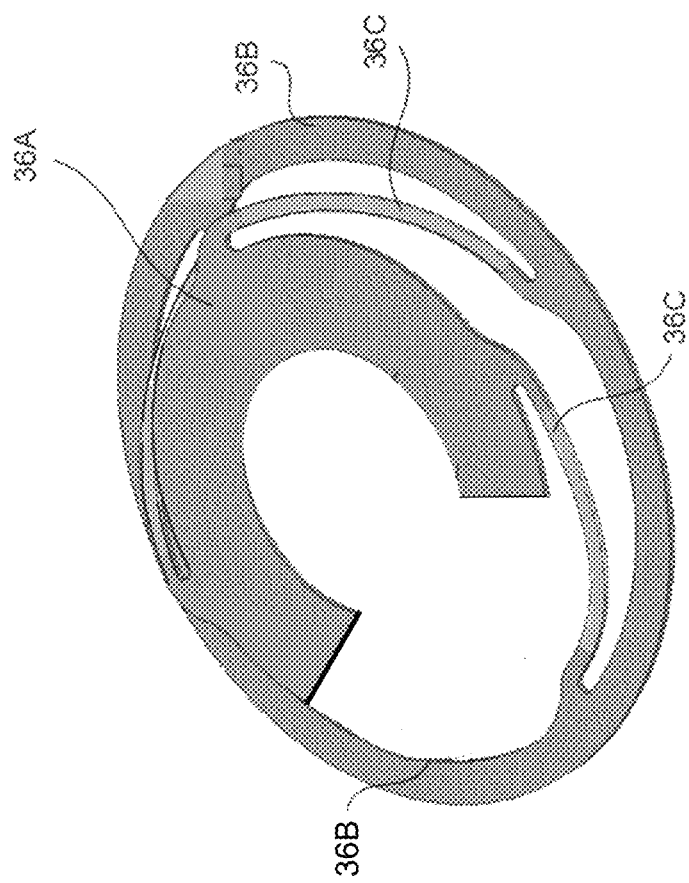
FIG. 9 is a perspective view of an inlet disk in the extracted position according to yet another example embodiment.

Other embodiments for the inlet disk 36 includes the inner portion 36A of the disk not having outer and inner edges that are concentric. In this alternative embodiment, the inner portion 36A of the disk 36 is not generally round. Further, the legs 36C may not be evenly or near evenly distributed about the inner portion 36A and/or the outer portion 36B. FIG. 8 illustrates the inlet disk 36 in which the connection location of the three legs 36C are not evenly distributed about the radial outer edge of the inner portion 36A or the radial inner edge of the outer portion 36B. This can also be seen as one of the four legs 36A being missing from the embodiment of FIGS. 6 and 7. As illustrated, the legs 36C are distributed only about 180 degrees around the outer radial edge of the inner portion 36A. In this embodiment, the legs 36C may be identical with respect to length, width and angle, as discussed above, or be different. In another embodiment, one or more of the inner portion 36A and the outer portion 36B of the inlet disk 36 may have an asymmetrical shape. In other words, the inside diameter and outside diameter of a portion 36A or 36B may not be symmetrical with each other or even be complete. FIG. 9 illustrates an inlet disk 36 in which the inner portion 36A has a partial annular, semi-annular and/or C-shape (with three legs 36C being connected to the inner portion 36A about the outer radial edge thereof. In another embodiment, two or more leg connections to the outer portion 36B may be missing. Like the embodiment of FIG. 8, the embodiment of FIG. 9 may have legs 36C that are identical (length, width and angle) or different from each other. One leg 36C may be cut off or removed in order to allow the disc 36 to tilt drastically in one direction compared to the other directions. In the embodiment of FIG. 9, it is understood that the apertures 38A of the valve seat 38 would not fully encircle aperture 38C thereof and would instead be disposed along the valve seat 38 adjacent the inner portion 36A.

Figure 10:
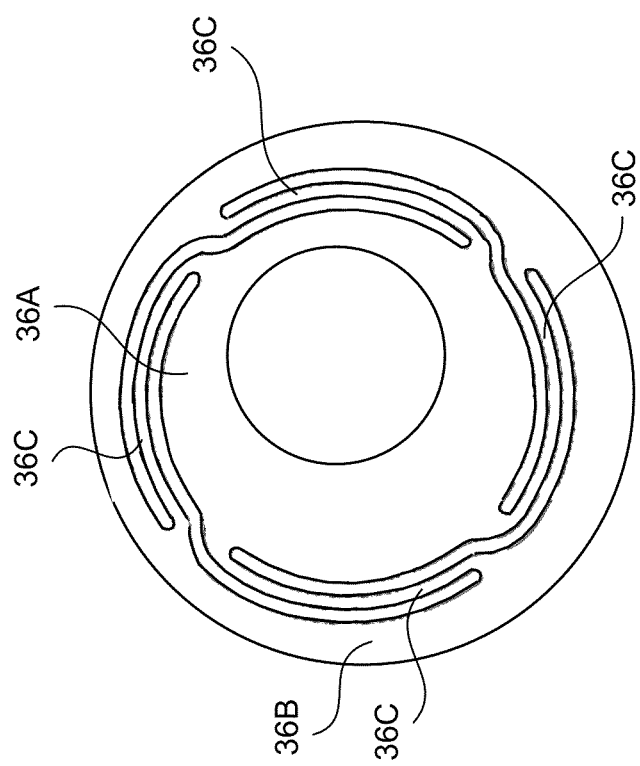
FIG. 10 is a top plan view of an inlet disk according to another example embodiment.
Figure 11:
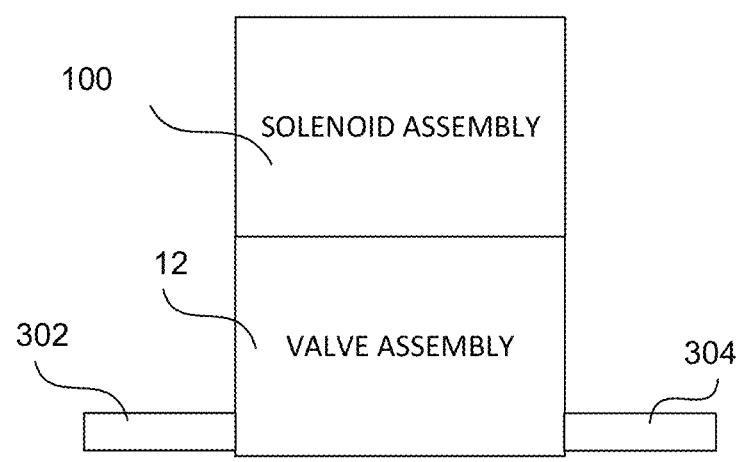
FIG. 11 is a diagram of a fuel pump having therein the valve group of FIG. 1.

Although the inlet disk 36 described above and illustrated in FIGS. 6-8 has the inner portion 36A and the outer portion 36B that are concentric, and have the outer radial edge and the inner radial edge of the inner portion 36A that are concentric, it is understood that the inner portion 36A and the outer portion 36B may have shapes that are nonconcentric. For example, FIG. 10 illustrates an inlet disk 36 in which the inner portion 36A and the outer portion 36B are not concentric relative to each other. In addition, the outer radial edge of the inner portion 36A is not concentric with the inner radial edge thereof; and the outer radial edge of the outer portion 36B is not concentric with the inner radial edge thereof. It is understood that the inlet disk 36 may have one or more of such nonconcentric features.

Best seen in FIGS. 2 and 3, the valve group 12 further includes a stop wire 50, which is a ring shaped member constructed from uncompressible material, such as metal or a rigid plastic. The stop wire 50 is disposed in the valve body 25 at the radial outer end of the valve seat 38 such that the stop wire 50 is disposed adjacent to and is radially outside of the seat ring 38B1. A diameter of the stop wire 50 is sized similarly to the amount of axial extension of the seat ring 38B1, such as being having a diameter that is slightly less than such axial extension. With the stop wire 50 be constructed from an uncompressible material, the stop wire 50 serves to limit the amount of compression of seat rings 38B1 and 38B2. Though the drawings depict the stop ring 50 as having a circular cross section, it is understood that the stop ring may have different cross sectional shapes.

Referring to FIGS. 1 and 2, the outlet spring 42 is housed in a spring retainer 52, which is shaped similarly to a cup. The inner surface of the outlet disk spring retainer 52 starts generally cylindrical in shape and then tapers radially outwardly at a distance above the top of the retainer, so as to increase the inner diameter and decrease the thickness at the top of the retainer. The taper of the inner surface helps to center the outlet spring 42 and keep the spring from being pinched, since the top of the outlet spring retainer 52 is also the valve stop of the outlet valve, which sets the stroke of the outlet disk 40. The wall thickness for the outlet spring retainer 52 is mostly constant, and the taper on the inside surface is similar on the outer surface too. This surface taper on the outside of the retainer 52 ensures a clean press fit into three ribs at the base of the valve body 25 in the fuel outlet passages 34.

During normal operation of the fuel pump, the solenoid power group is actuated by applying a current to the solenoid which builds a current-generated magnetic force that begins moving the armature of the power group to which the plunger 24 is connected. The plunger 46 moves away from the valve seat 38 which increases the size of the pump chamber 46 and lowers the pressure therein. The lower pressure in the pump chamber 46 creates a differential pressure across the inlet disk 36. The shallow groove 38D on the valve seat 38, which faces and is adjacent the inlet disk 36, allows for the pressure of the inlet chamber 44 to be communicated to a large surface area, increasing the differential pressure and helping the valve group 12 be resistant to viscosity-driven stiction which would slow the separation of the inlet disk 36 from the valve seat 38. Once the differential pressure across the inlet disk 36 exceeds the ability of the disk's internal spring (i.e., legs 36C) to hold the disk 36 against the seat 38 in the sealed or position of the inlet check valve, the inlet disk 36 will open with the inner portion 36A lifting from the valve seat 38. In particular, the differential pressure across the inlet disk 36 lifts the inner portion 36A of the inlet disk 36 at the least stiff location of the asymmetric spring formed by the legs 36C in order to trigger a peeling effect and improve the repeatability and shortening of the opening time of the inlet disk 36. To further take advantage of the asymmetry of the inlet disk 36, the radial location of the weakest/least stiff spot of the asymmetric spring portion on the disk is marked with a notch 36D. This notch 36D is used to orient the inlet disk 36 to align the least stiff part of the disk to be directly above the fuel inlet passage 32 feeding the inlet chamber 44. This allows for the fuel coming directly from the protection valve 30 to have a generally straight path through the flow apertures 38A on the valve seat 38 and impinge on the inlet disk 36, providing more separation of the inlet disk 36 which reduces the time required to fill the pump chamber 46. It may take the entire remainder of the cycle for the inlet chamber 44 to reach pressure stabilization with the fuel tank in which the fuel pump is disposed. The solenoid remains activated/energized for a short period of time following completion of the full stroke of the armature and the plunger 24 in order to allow the pump chamber 46 to fill completely. As the pressure of the pump chamber 46 approaches the pressure of the inlet chamber 44, the incoming fuel velocity decreases. The asymmetry of the inlet valve disk 36 is also used during the separation from the bushing 26 in that the separation from the bushing starts at the portion of the inlet disk 36 influenced by the stiffest spring effect and then the disk 36 peels off from the bushing 26 and returns to the valve seat 38. This occurs when the momentum of the incoming fuel is reduced sufficiently, such that the inner portion 36A of the inlet disk 36 peels off from the stop 26A of bushing 26, which is stepped at step 26B to reduce the contact surface of the bushing 26 with the inlet disk 36 and returns to the valve seat 38 which stops the incoming fuel flow into the pump chamber 46.

As the solenoid power group is de-energized and the magnetic field in the solenoid decays, the armature of the solenoid is pushed by a calibration spring and the resulting motion of the plunger 24 increases the pressure in the pump chamber 46. When the differential pressure between the pump chamber 46 and the outlet chamber 48 exceeds the load of the outlet valve spring 42, the outlet disk 40 separates from the protrusion 38E of the seat ring 38B2 on the valve seat 38 and the fuel flows from the pump chamber 46 into the outlet chamber 48. The fuel flow exiting the pump chamber 46 is turned 90 degrees before reaching the fuel outlet port which imparts momentum to the low mass outlet disk 40. Adding to the forces designed to move the outlet disk 40 to allow full flow in less than 1 millisecond, the fuel flow is pushed through a small annulus between the outer diameter of the outlet disk 40 and the walls of the valve body 25 to create a high velocity which takes advantage of the high drag coefficient of the thin, sharp edge outlet disk 40. This drag and transferred momentum leads to nearly digital (open/closed) motion of the outlet disk 40. As the outlet disk 40 is forced away from the valve seat ring 38B2, the forces are adding potential energy into the outlet spring 42. The fuel exiting the pump 100 passes through the three fuel outlet passages 34 (FIG. 1) on the way to the outlet port and into the fuel line. There is also a small hole at the base of the outlet spring retainer 52 which allows for the equalization of pressure inside and outside of the retainer while the outlet disk 40 is forced against the stop at the rim or top of the retainer 52. This equalization of the pressures reduces the separation time for the outlet disk 42 from the rim and/or outlet disk stop of the outlet spring retainer 52. The outlet disk stop also has a small contact area to reduce fluidic stiction between the outlet disk 40 and the stop to further improve separation time and consistency. As the fuel exits the outlet chamber 48, the plunger 24 approaches the valve seat 38.

FIG. 10 is a block diagram illustrating a fluid pump 10 having a solenoid power group or assembly 100 coupled to a valve group 12. In the illustrated example embodiment, the fluid pump 10 is a fuel pump but it is understood that the fluid pump 10 may be used to pump other fluids in other applications. The valve group 12 is operatively coupled to the solenoid power group 100 for pumping fuel from a fluid inlet 302 to a fluid outlet 304 of the valve group 12. The fluid outlet 304 is configured for connection to a fluid line (not shown) for supplying the fluid under pressure. An ECU (not shown) controls the solenoid power group 100 to move the armature therein in a reciprocating manner, which causes fuel to flow from the fluid inlet 302 to the pump chamber 46 via the inlet chamber 44 and the inlet valve, and to flow from the pump chamber 46 to the fluid outlet 302 via the outlet chamber 48 and the outlet valve, as described above. The particular features of the solenoid power group 100 and the fluid pump 10 may include the features described in the U.S. patent applications identified in the cross reference section above.

Example embodiment would be very useful in other fluid pumping applications that operate at high frequencies and work on the principle of positive displacement pumps using an inlet and outlet check style valves. The valve configuration described above allows for a very compact valve group 12 and fuel pump 100 with relatively small displacements for very high flows. Any pumping application where space is limited would be a good fit for the disclosed embodiments.

The valve seat 38 may be constructed from molded plastic with a secondary process of molding the seat rings 38 to the plastic. The valve seat 38 may be photoetched, with a secondary process of molded rubber sealing rings for the apertures 38A and/or 38C. The valve seat 38 may be stamped or coined, with a secondary process molded rubber to form the sealing rings.

The valve seat 38 may be raised or offset along the outside diameter of the top of the seat. This allows the inlet disc 36 to be clamped to the valve seat 38 at different heights.

The valve seat 38 may be made similarly to what was described above, but instead of having a metal-to-metal sealing interface on the inlet side of the seat, the rubber molding process may add rubber to the outer diameter of each aperture 38A of a given height. The flatness of the valve seat 38 does not need to be controlled tightly because the rubber rings around each aperture 38A may conform to easily seal against the inlet disk 36. While the sealing surface of the apertures 38A are raised, the inlet disk 36 may be still flush to the valve seat 38. This means that the inlet disc 36 is spring-loaded against the rubber inlet which gives the fuel pump 10 an inlet cracking pressure. This height may be adjusted in order to adjust the cracking pressure of the inlet disc to the desired number.

In certain situations or designs, a certain amount of leak through the inlet is required to be controlled. In this case, a secondary grinding process can be done to the top of valve seat. For instance, radial grooves starting from the direct center of the disc can be grinded onto the valve seat that extend towards the outside of the disc 360 degrees around the part. Depth of the grooves caused by grinding can be changed in order to minimize leak. This helps since your are controlling the leak in the direction intended across the sealing surfaces between the Inlet disc and valve seat.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

We claim:

1. A valve assembly for a fluid pump, comprising:
a valve body;
a fluid inlet and a fluid outlet defined in the valve body;
a valve seat; and
an inlet disk disposed in the valve body having an inner portion, an outer portion fixed within the valve body, and a plurality of legs connected between the inner portion and the outer portion so that the inner portion is movable between a first position against the valve seat and a second position spaced apart from the valve seat and that a spring bias force is applied to the inner portion against movement of the inner portion from the first position, the plurality of legs, the inner portion and the outer portion are configured such that the spring bias force is an asymmetric spring bias force applied to the inner portion of the inlet disk,
wherein the inlet disk includes at least one of: the inner portion and the outer portion not being concentric with each other; an outer radial edge of the inner portion not being concentric with an inner radial edge of the inner portion; or an outer radial edge of the outer portion not being concentric with an inner radial edge of the outer portion.

2. The valve assembly of claim 1, wherein the plurality of legs comprises four legs.

3. The valve assembly of claim 1, wherein at least one dimension of a first leg of the plurality of legs is different from the at least one dimension of at least one second leg of the plurality of legs.

4. The valve assembly of claim 1, further comprising a stop member having a stop surface against which the inner portion of the inlet disk contacts when the inner portion is in the second position, and the outer portion and each leg do not contact the stop surface when the inner portion of the inlet disk is in the second position.

5. The valve assembly of claim 1, wherein connection locations of the legs along the inner portion are evenly distributed about the inner portion.

6. The valve assembly of claim 1, wherein connection locations of the legs along the inner portion are not even distributed about the inner portion.

7. The valve assembly of claim 1, wherein the inner portion has a semi-annular shape.

8. The valve assembly of claim 1, wherein the legs, the inner portion and the outer portion are configured such that a first section of the inner portion of the inlet disk is moved from the valve seat prior to other sections of the inner portion moving from the valve seat, the inlet disk and the valve seat form at least part of an inlet valve of the valve assembly, the valve body comprises an inlet fluid passage in fluid communication with the inlet valve, and the inlet fluid passage is disposed directly beneath the valve seat and the first section of the inner portion of the inlet disk.

9. The valve assembly of claim 1, wherein the inner portion is ring shaped, having a through-hole in a radial center portion of the inlet disk, and the outer portion is ring shaped.

10. The valve assembly of claim 1, wherein the inlet disk includes at least one of the outer radial edge of the inner portion not being concentric with the inner radial edge of the inner portion, or the outer radial edge of the outer portion not being concentric with the inner radial edge of the outer portion.

11. A check valve, comprising:
a valve body;
a fluid inlet and a fluid outlet defined in the valve body;
a valve seat; and
a disk disposed in the valve body having an inner portion, an outer portion fixed within the valve body, and a plurality of legs connected between the inner portion and the outer portion so that the inner portion is movable between a first position against the valve seat and a second position spaced apart from the valve seat and that a spring bias force is applied to the inner portion against movement of the inner portion from the first position, the legs, the inner portion and the outer portion being configured and arranged such that the spring bias force is an asymmetric spring bias force applied to the inner portion of the inlet disk,
wherein the inlet disk includes at least one of the outer radial edge of the inner portion not being concentric with the inner radial edge of the inner portion, or the outer radial edge of the outer portion not being concentric with the inner radial edge of the outer portion.

12. The check valve of claim 11, wherein the plurality of legs comprises four legs.

13. The check valve of claim 11, wherein at least one dimension of a first leg of the plurality of legs is different from the at least one dimension of one or more second legs of the plurality of legs, the at least one dimensions is at least one of a length of the first leg, a width of the first leg, or an angle of the first leg relative to the outer portion and the inner portion of the inlet disk.

14. The check valve of claim 11, further comprising a stop member having a stop surface against which the inner portion of the inlet disk contacts when the inner portion is in the second position, wherein a connection between each leg and the inner portion does not contact the stop surface when the inner portion of the inlet disk is in the second position.

15. The check valve of claim 11, wherein the plurality of legs, the inner portion and the outer portion are such that a first section of the inner portion of the inlet disk is moved from the valve seat prior to other sections of the inner portion moving from the valve seat, the valve body comprises an inlet fluid passage in fluid communication between the fluid inlet and the valve seat, and the inlet fluid passage is disposed directly beneath the valve seat and the first section of the inner portion of the inlet disk.

16. The check valve of claim 11, wherein the inner portion is ring shaped, having a through-hole in a radial center portion of the inlet disk, and the outer portion is ring shaped.

17. The check valve of claim 11, wherein the inner portion has a semi-annular shape.

18. The check valve of claim 11, wherein connection locations of the legs to the inner portion of the inlet disk are not evenly distributed about the inner portion.

19. The check valve of claim 11, wherein connection locations of the legs to the inner portion of the inlet disk are evenly distributed about the inner portion.

20. The check valve of claim 11, wherein the inner portion and the outer portion are not concentric with each other.

21. A valve assembly for a fluid pump, comprising:
a valve body;
a fluid inlet and a fluid outlet defined in the valve body;
a valve seat; and
an inlet disk disposed in the valve body having an inner portion, an outer portion fixed within the valve body, and a plurality of legs connected between the inner portion and the outer portion so that the inner portion is movable between a first position against the valve seat and a second position spaced apart from the valve seat and that a spring bias force is applied to the inner portion against movement of the inner portion from the first position, the plurality of legs, the inner portion and the outer portion are configured such that the spring bias force is an asymmetric spring bias force applied to the inner portion of the inlet disk,
wherein at least one dimension of a first leg of the plurality of legs is different from the at least one dimension of at least one second leg of the plurality of legs, the at least one dimensions comprises at least one of a length of the first leg, a width of the first leg, or an angle of the first leg relative to the outer portion and the inner portion of the inlet disk.

22. The valve assembly of claim 21, wherein the inner portion has a semi-annular shape.

23. The valve assembly of claim 21, wherein the inlet disk includes at least one of: an outer radial edge of the inner portion is not concentric with an inner radial edge of the inner portion; or an outer radial edge of the outer portion is not concentric with an inner radial edge of the outer portion.

* * * * *